Figure 1:
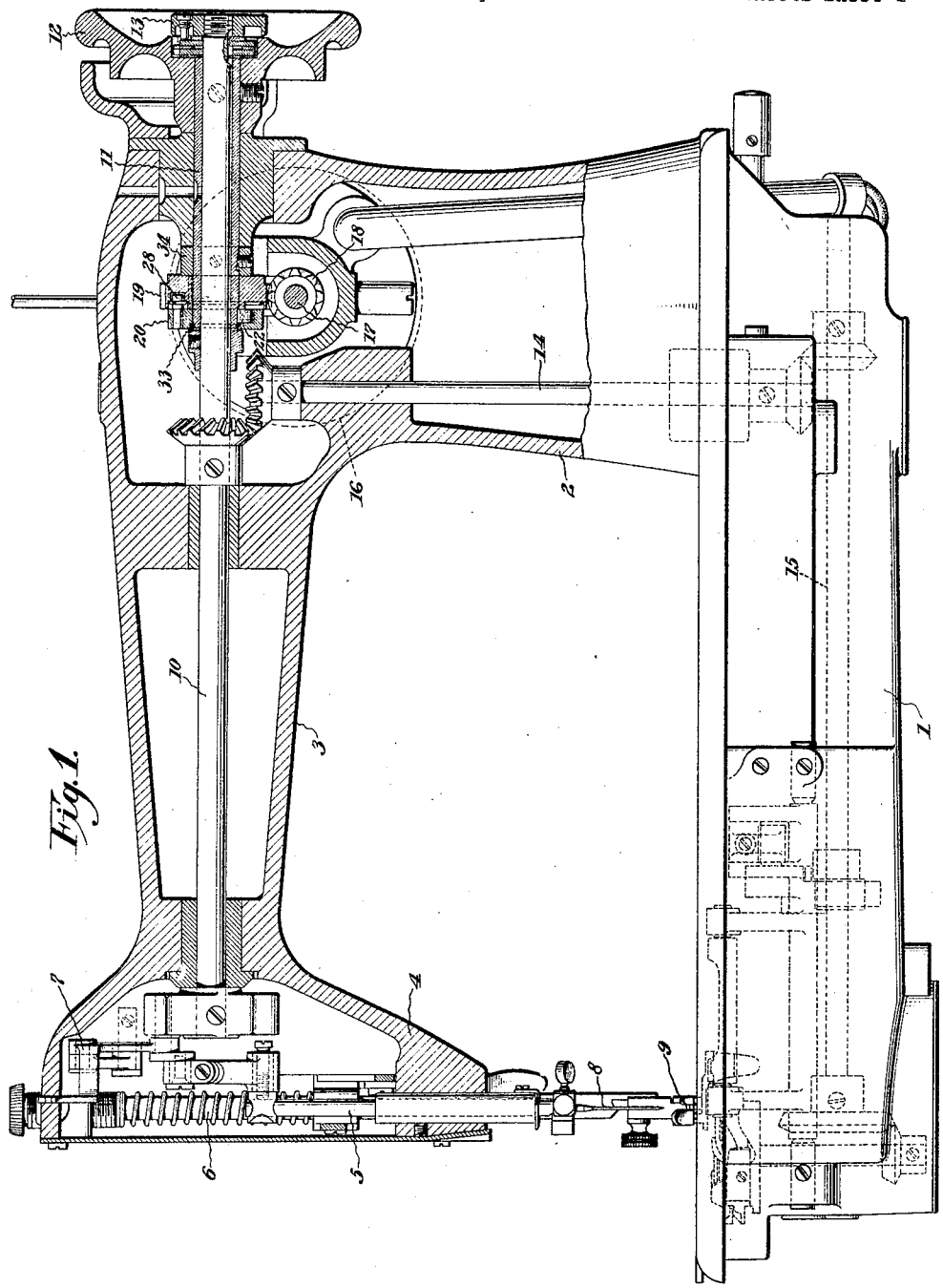

Aug. 4, 1925.

A. GRIEB 1,548,458

RESILIENT GEAR DRIVE FOR ELECTRIC SEWING MACHINES

Filed April 24 1924   2 Sheets-Sheet 1

WITNESSES

INVENTOR
Alfred Grieb
BY
ATTORNEY

Aug. 4, 1925.

A. GRIEB 1,548,458

RESILIENT GEAR DRIVE FOR ELECTRIC SEWING MACHINES

Filed April 24 1924　　2 Sheets-Sheet 2

WITNESSES
Godfrey Pecina
John F. Heing

INVENTOR
Alfred Grieb
BY Henry J Miller
ATTORNEY

Patented Aug. 4, 1925.

1,548,458

UNITED STATES PATENT OFFICE.

ALFRED GRIEB, OF ELIZABETH, NEW JERSEY, ASSIGNOR TO THE SINGER MANUFACTURING COMPANY, OF ELIZABETH, NEW JERSEY, A CORPORATION OF NEW JERSEY.

RESILIENT GEAR DRIVE FOR ELECTRIC SEWING MACHINES.

Application filed April 24, 1924. Serial No. 708,626.

*To all whom it may concern:*

Be it known that I, ALFRED GRIEB, a citizen of the United States, residing at Elizabeth, in the county of Union and State of New Jersey, have invented certain new and useful Improvements in Resilient Gear Drives for Electric Sewing Machines, of which the following is a specification, reference being had therein to the accompanying drawings.

An electric sewing machine having a gear drive between the motor and machine shafts is subject to gear noise which is probably caused by the cyclically variable nature of the motor load as occasioned, for example, by the reciprocating needle-bar and take-up. Furthermore, the average load on the motor varies with the character of the work being sewed; such load increasing with the thickness or heaviness of the work. Sudden changes in load are also caused by sewing over cross seams.

The present invention has for an object to effectively silence the gear drive of an electric sewing machine.

Another object of the invention is to provide a gear drive for an electric sewing machine which will run quietly at all loads i. e., whether the machine is running light or sewing up to the limit of its capacity.

Another object of the invention is to provide a quiet gear drive for an electric sewing machine which will respond practically instantaneously to sudden changes in load and without noise or an inordinate differential motion occurring between the motor and machine shafts.

A further object of the invention is to provide a resilient gear drive in which a light spring action is interposed at no load or light loads and progressively heavier spring actions are interposed at progressively heavier loads, with a minimum of differential motion between the motor and machine shafts.

Still further, the invention has for an object to provide a combined resilient gear drive and one-way clutch of simplified construction which possesses the advantages of being easy to assemble and disassemble and which will function without danger of interference between the clutch and resilient drive elements.

To the attainment of the ends in view the driven shaft of the machine has freely mounted thereon the driven gear element alongside of which may be freely mounted a clutch ring having in its face adjacent the gear an eccentric slot which houses a clutch-roll and spring. The adjacent face of the driven gear is formed with an annular groove having a deepened portion of limited circumferential extent, say 45°, into which projects a pin fixed to the clutch-ring. A driving spring of preferably less than one convolution is housed in the annular groove and has an eye at one end embracing the pin fixed to the clutch-ring. The other end of the spring is anchored in a hole in the gear. The spring is preferably initially bent to a curvature of a somewhat greater radius than that of the outer wall of its housing groove in the driven gear so that, when the spring is placed in the gear, it expands into engagement with said outer wall and presses against the latter preferably from its eyed end to a point substantially diametrically opposite such end.

When a driving torque is applied to the gear, it is transmitted to the clutch-ring and shaft through the spring. In the present instance, the spring has the peculiar property of yielding slightly between its eyed end and an intermediate point to light torques without being drawn entirely out of engagement with the outer wall of its housing groove; the extent of yield being proportional to the torque yet representing a limited differential motion between the gear and clutch-ring of only a few degrees. This range of counter-torque afforded by the spring in conjunction with the small differential motion between the gear and driven shaft is a desirable characteristic of the present improvement, in that the requirements of an electric sewing machine gear drive are thereby met to a nicety.

Under heavier torques the spring is drawn entirely out of engagement with the outer wall of its housing groove and under still heavier or over-load torques the pin fixed to the clutch-ring is engaged by the trailing end-wall of the deepened portion of the annular groove in the driven gear and over-strain of the spring prevented, If the load is suddenly relieved, as when sewing from thick to thin work, the spring may expand momentarily into cushioned and quiet contact with the outer wall of its housing groove; the pin at no time being free to strike the leading end wall of the deeply grooved portion of the driven gear.

Figure 2:
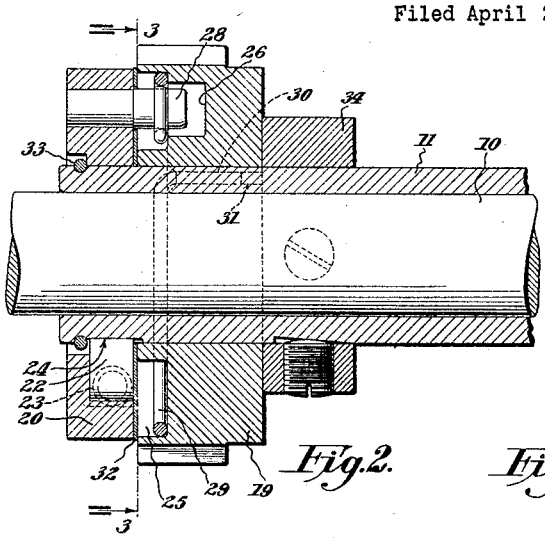
Figure 3:
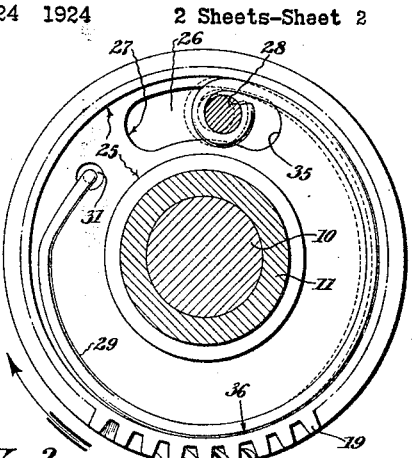
Figure 4:
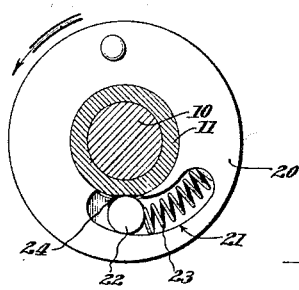
Figure 5:
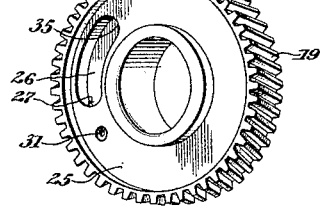
Figure 6:
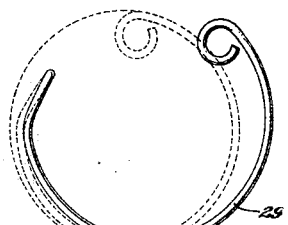
Figure 7:
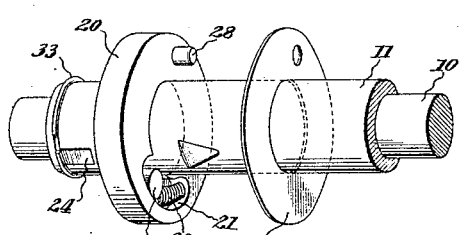

In the accompanying drawings, Fig. 1 is a side elevation, partly in section, of an electric sewing machine embodying the invention. Fig. 2 is a sectional view through the driven gear and associated parts, taken longitudinally of the sewing machine main-shaft. Fig. 3 is a sectional view on the line 3—3, Fig. 2. Fig. 4 is an inner face view of the clutch-ring. Fig. 5 is a perspective view of the driven gear. Fig. 6 is a view of the driving spring member and Fig. 7 is a perspective view of the clutch-ring and separating washer on the driven shaft.

For the purposes of the present disclosure the invention is described as embodied in an electric sewing machine constructed with a built-in motor substantially in accordance with the disclosure of the patent to Dosch et al., No. 1,311,114, of July 22, 1919, the frame of the machine being formed with a hollow trough-shaped bed substantially of the form disclosed in the patent to Hemleb, No. 1,409,951, of March 21, 1922.

Such a machine has a frame comprising the hollow bed 1, standard 2 and overhanging arm 3, terminating in the head 4 which houses the usual needle-bar 5, presser-bar 6 and take-up mechanism 7; the needle and presser-bars being equipped at their lower ends with the needle 8 and presser-foot 9, respectively.

Journaled within and longitudinally of the arm 3 is the main-shaft 10 on the rearward end of which is journaled the sleeve shaft-section 11 carrying the balance-wheel 12, between which and the shaft 10 is the usual manually-operable clutch 13 which may be operated to disconnect the shaft 10 from the balance-wheel when it is desired to run the latter independently of the machine for bobbin winding purposes. The main-shaft 10 is connected through the shaft 14 to drive the lower shaft 15 which actuates the loop-taking and work-feeding mechanisms.

Let into the rearward wall of the standard 2 is the motor driving unit 16 having fixed to its power-shaft 17 the driving gear 18 which meshes with the driven gear 19 mounted on and movable circularly relative to the driven or sleeve-shaft 11. Disposed on the shaft 11 adjacent the gear 19 is a clutch-ring 20 formed with the eccentric slot 21 in which is housed the clutch-roll 22 and spring 23 constituting a one-way acting clutch connection between the clutch-ring 20 and driven shaft 11. The shaft 11 may be formed with a slight flat 24 for insuring a driving grip by the clutch-roll 22 in case there should develop any tendency toward slippage.

The face of the gear 19 adjacent the clutch-ring 20 is formed with an annular groove 25 having a deepened portion 26 of limited extent, the trailing end wall 27 of which constitutes an over-load stop for the pin 28 carried by the clutch-ring 20. The pin 28 projects into the deepened portion 26 of the annular groove 25 and is embraced by the eyed or trailing end of the curved wire spring 29 which encircles the shaft 11 and is housed within the groove 25 in the driven gear 19. The leading end 30 of the spring 29, Fig. 2, is bent into parallelism with the shaft 11 and is anchored in a hole 31, Fig. 5, in the gear 19. A thin metal washer 32 is preferably placed between the ring and gear members 20 and 19 to hold the clutch-roll 22 and spring 23 from slipping into the groove 25. Endwise movement of the ring gear members on the shaft 11 is prevented by suitable means such as the lock-ring 33 and collar 34.

The approximate unsprung shape of the spring 29 is shown in full lines in Fig. 6 and its shape when sprung to working position within the gear 19 is shown in dotted lines in the same figure. It will be observed that the outer wall of the groove 25 constitutes a confining means acting to limit the expansion of the spring 29, and that the pin 28 can at no time contact with the leading end 35 of the deepened portion 26 of the annular groove in the driven gear.

Under light driving torques the spring 29 will yield between its eyed end and a point 36 substantially opposite the pin 28, as indicated in dotted lines in Fig. 3; the spring 29 maintaining contact with the confining means or outer wall of the groove 25 adjacent the point 36. Under heavier torques the spring is, of course, drawn entirely out of contact with the outer wall of its housing groove, and under overload torques the trailing end 27 of the groove 26 engages and drives the pin 28; thereby preventing deformation or breakage of the spring. The interposition of the spring 29 between the gear 19 and driven shaft 11 prevents backlash in the gears 18, 19, and insures quiet running thereof at all loads. The range of relative movement between the gear 19 and shaft 11 is small and the gear is therefore quick to adapt itself to variations in load.

The one-way clutch connection 21, 22, 24, permits the machine to be turned over by hand by manipulation of the balance-wheel 12 while the motor is at rest. It has a further desirable function in permitting a momentary slip between the collar 20 and shaft 11 in the reverse of driving direction when the driving torque is suddenly relieved for any cause and the spring 29, pin 28 and collar 20, in their rebound, are arrested by engagement of the spring with the outer wall of the groove 25.

Having thus set forth the nature of the invention, what I claim herein is:—

The combination with a driving gear and driven shaft, of a driven gear concentric with and movable relative to said shaft, said gear being formed in one face with an annular groove, a ring disposed adjacent the grooved face of said gear and having a one-way driving connection with said shaft, a pin carried by said ring and projecting into said groove, and a bow spring housed in said groove and fixedly connected at one end to said pin, the other end of said spring being anchored to said gear, said spring having an unsprung curvature, the radius of which is greater than that of the outer wall of said annular groove and being sprung to a position within said groove in contact with said outer wall.

In testimony whereof, I have signed my name to this specification.

ALFRED GRIEB.